United States Patent
Stettes et al.

(10) Patent No.: US 6,298,769 B1
(45) Date of Patent: Oct. 9, 2001

(54) TABLE-TOP COFFEE VENDING MACHINE AND METHOD

(75) Inventors: Gregory Glen Stettes, Pacific; Pieter Wilhelmus Werner Bouwkamp, University City; Frank W. Krockenberger, St. Louis, all of MO (US)

(73) Assignee: Crane Co., Stamford, CT (US)

( * ) Notice: Subject to any disclaimer, the term of this patent is extended or adjusted under 35 U.S.C. 154(b) by 0 days.

(21) Appl. No.: 09/650,919

(22) Filed: Aug. 29, 2000

Related U.S. Application Data

(62) Division of application No. 09/396,815, filed on Sep. 14, 1999, now Pat. No. 6,176,172.

(51) Int. Cl.[7] ..................................................... A47J 31/40
(52) U.S. Cl. ......................... 99/289 R; 99/290; 99/279; 222/129.1; 222/146.5
(58) Field of Search ................................ 99/289 R, 290, 99/289 P, 289 D, 289 T, 279; 222/129.1, 129.2, 129.3, 129.4, 146.5

(56) References Cited

U.S. PATENT DOCUMENTS

| | | | |
|---|---|---|---|
| 3,019,946 | * | 2/1962 | Mueller .......................... 99/289 R X |
| 3,295,998 | * | 1/1967 | Goros ................................ 99/289 R |
| 5,957,033 | * | 9/1999 | In-Albon ........................ 99/289 R X |

* cited by examiner

Primary Examiner—Reginald L. Alexander
(74) Attorney, Agent, or Firm—Hughes & Luce, LLP

(57) ABSTRACT

A table-top coffee vending machine providing slide-out storage containers for easy filling and removal, a compact fast acting coffee brewing system and a filter paper cutting and storage system. A plurality of storage containers for ground coffee, hot chocolate ingredient and condiment are provided in a rack system that allows the group of containers to be slid out of the machine cabinet on telescoping rails to allow easy filling and removal of the containers. The brewing method includes simultaneously supplying water and coffee grounds to a brewer, stopping the supply of both, allowing the mixture to steep and then beginning to remove the mixture from the brewer while reinitiating the supply of water to the brewer for a sufficient time to supply a complete cup of coffee at a cup station. The filter paper cutter cuts lengths of paper from a continuous supply of filter paper after it is used in the brewer to filter the coffee. The cutter is saw-toothed and a paper clamping mechanism is used to clamp the paper in the area where it is to be cut. The cut lengths of paper are collected in a removable tray and are compressed into a stack by a sweeper bar that is activated in conjunction with the cutter action.

2 Claims, 14 Drawing Sheets

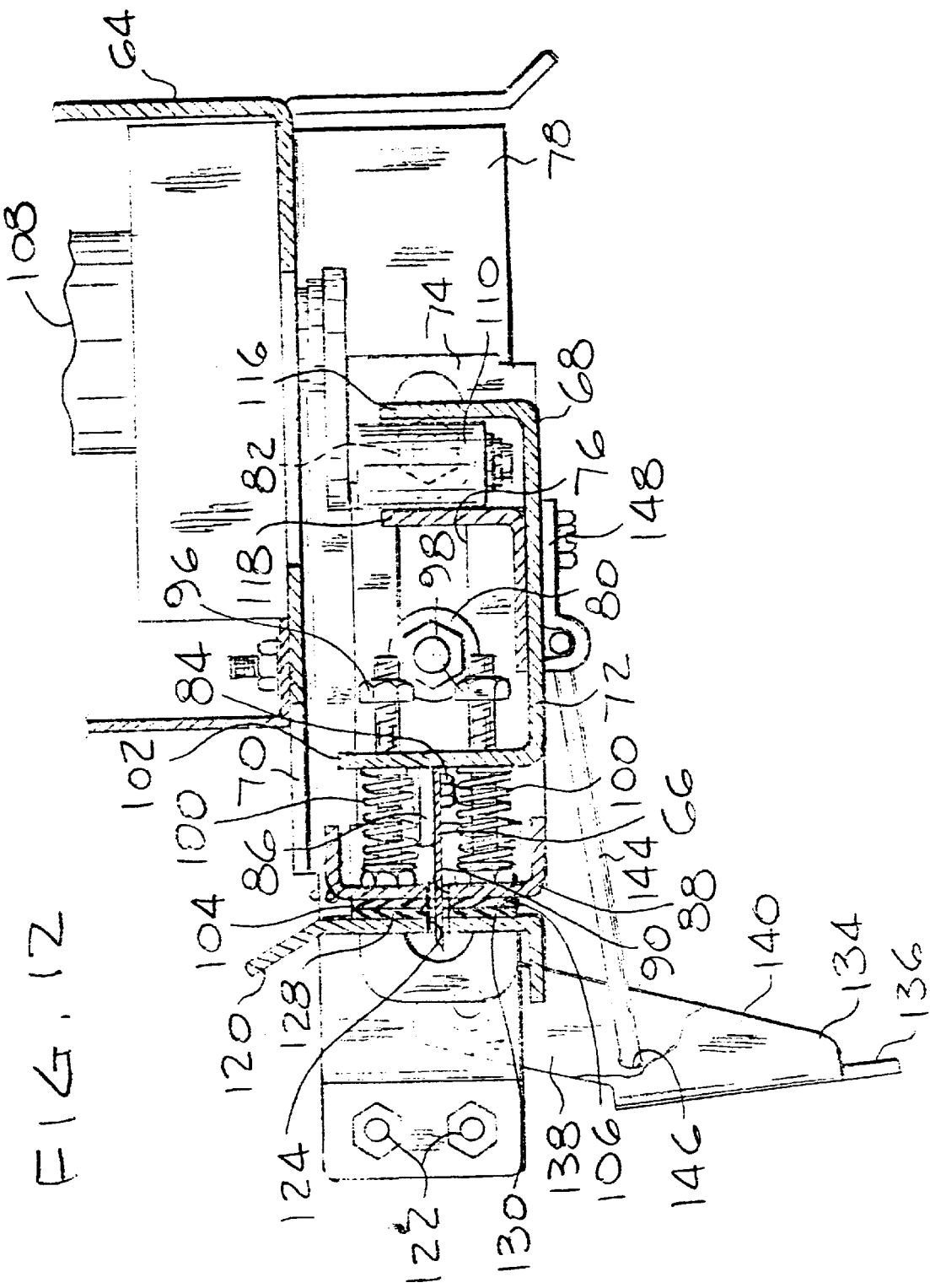

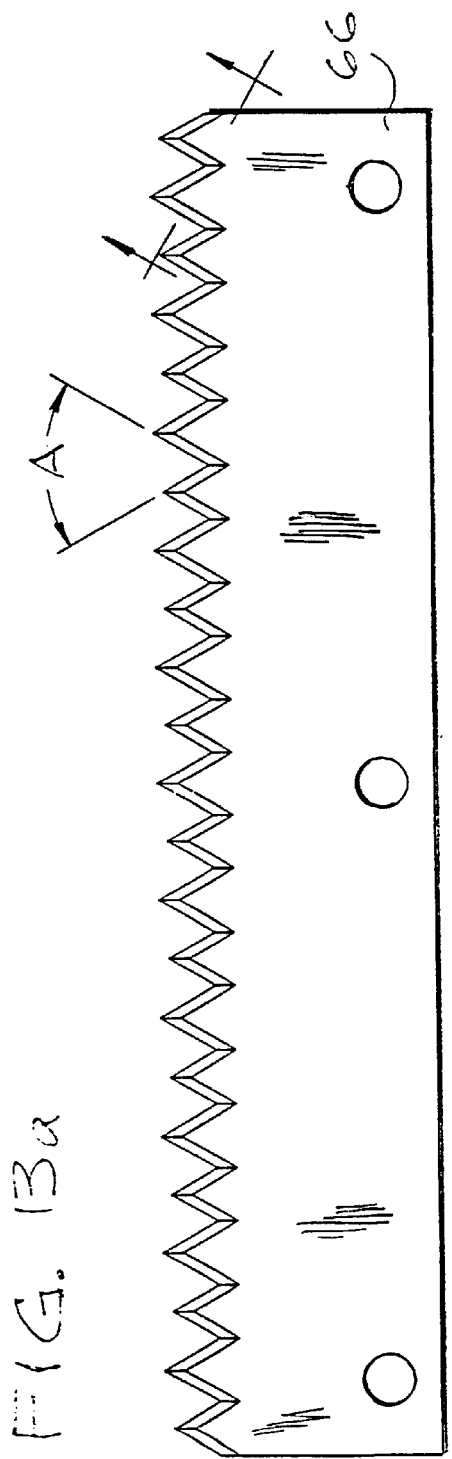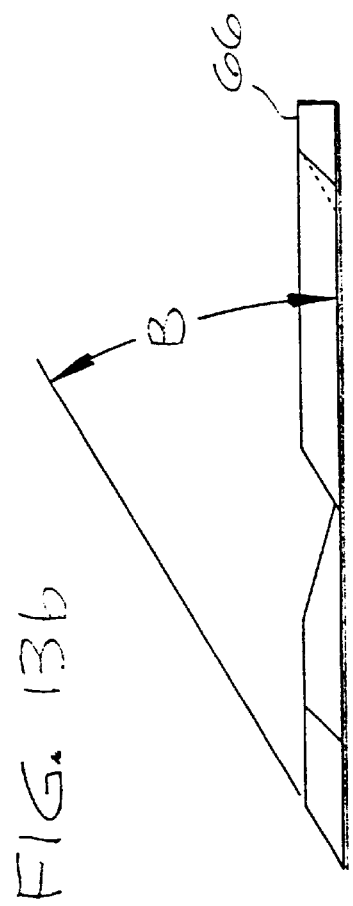

TABLE-TOP COFFEE VENDING MACHINE AND METHOD

CROSS-REFERENCE TO RELATED APPLICATIONS

This application is a divisional of U.S. Ser. No. 09/396,815, filed Sep. 14, 1999, now U.S. Pat. No. 6,176,172.

BACKGROUND OF THE INVENTION

The present invention relates to table-top coffee vending machines and more particularly to table-top coffee vending machines that brew coffee by the cup.

Table-top coffee vending machines need to be very compact because of the space limitations, both vertically and horizontally, that are usually present where such machines are utilized. Additionally, such machines need to have substantial capacity to vend many cups of coffee without the need to be serviced, since the cost of service is a substantial cost factor in the profitability of such machines.

SUMMARY OF THE INVENTION

The present invention overcomes the difficulties and disadvantages of prior art table-top coffee vending machines by providing a machine that is compact and yet requires less frequent service and is easier to service than other prior art machines. These advantages are achieved by providing a table-top coffee machine that utilizes easy to fill slide-out coffee, hot chocolate and condiment storage compartments, a compact fast acting coffee brewing system and a filter paper cutting and storage system.

In one aspect of the present invention, a table-top coffee vending machine is provided having a housing, a brewing system with a brewer, a hot chocolate mixing bowl, a hot chocolate and coffee storage system comprising at least one storage container having a removable top cap and a dispensing mechanism for dispensing an ingredient therefrom at least one telescoping rail supporting the at least one storage container for sliding movement between an operating position wherein the rail is in a retracted position and the container is disposed within the housing and the dispensing mechanism can be operated to supply said ingredient, and a filling position wherein the rail is in an extended position with the container disposed at least partially outside the housing such that the cap can be removed from the container for filling.

In another aspect of the invention a table-top coffee vending machine is provided having a housing, a brewing system with a brewer, a hot chocolate mixing bowl, an ingredient and coffee storage system comprising a pair of storage containers having an opening in the top and a dispensing mechanism associated therewith for dispensing ingredients from the containers a pair of members mounted to the housing and supporting the pair of containers for movement between an operating position wherein the containers are disposed within the housing and the dispensing mechanism can be operated to supply said ingredients, and a filling position wherein the containers are disposed at least partially outside the housing such that the containers can be filled.

In accordance with still another aspect of the present invention, a paper cutter is provided comprising a support structure having a front wall with an elongated slot defined therein over which a paper sheet can pass, a cutting blade support member mounted for movement relative to the support structure, a cutting blade mounted to the support member for movement therewith, a reciprocating drive mechanism connected to the cutting blade support member so as to move it between a retracted position in which the blade is disposed remote from the front wall of the support structure and an extended position where it passes through the slot in the front wall whereby the blade will engage the paper extending over the slot and cut it as the blade moves between the retracted and extended positions. The paper cutter is preferably a saw tooth blade, and more particularly is provided with uneven teeth for penetrating the filter paper.

The reciprocating drive mechanism preferably includes a compression plate mounted for reciprocating movement on the blade support member and has a front wall having a slot therein in alignment with the slot in the front wall of the support structure, the compression plate being movable between an extended position where the blade is remote from the slot in its front wall and a compressed position in which the blade extends through the slot in its front wall, the compression plate further being biased toward the extended position, the compression plate being moved from its extended position to its compressed position by engagement of its front wall with the front wall of the support structure with the paper pressed therebetween as the support member is moved towards its extended position. In addition, an elongated member is preferably disposed adjacent the front wall of the support structure along and adjacent the slot therein and is engageable with the paper passing over the slot so as to urge the paper away from the front wall of the support structure when the support member moves toward its retraced position. The elongated member is a preferably a tensioned wire disposed along the length of the slot.

In another aspect of the present invention, a cut paper collection tray is provided disposed beneath the front wall of the support structure to receive cut paper therein, the tray having a substantially flat bottom and a front wall adjacent the front wall of the support structure, a sweeper bar moveable from a retracted position remote from the front wall of the tray and a forward position adjacent the front wall of the tray whereby cut pieces of paper are pushed along the bottom of the tray toward the front wall of the tray when the sweeper bar is moved from its retracted to its forward position. The sweeper bar is preferably mounted to the support structure for pivotal movement between its forward and retracted positions and is operatively connected to the support member so as to cause movement of the sweeper member from its retracted position to its forward position as the support member is moved from its retracted position to its extended position.

In yet a further aspect of the present invention, a method of cutting paper is provided, comprising the steps of positioning a paper strip in engagement with a support structure having an elongated slot therein which extends transverse to and completely across the width of the paper, clamping the paper strip between the support structure and a support member, moving a cutting blade through the paper from a side opposite the slot with the blade passing through the slot to sever the paper strip. The method also preferably includes using a saw-tooth blade. The method further preferably includes placing a tray beneath the severed end of the strip to receive the strip, moving a sweeper bar within the tray to move the severed strip towards an end of the tray and then moving a portion of the paper strip up stream of the blade adjacent the slot, away from the support structure.

In still another aspect of the present invention, a method of brewing coffee is provided which includes the steps of initiating and continuing the flow of water into a brewing chamber, substantially simultaneously initiating and then continuing the flow of ground coffee into the brewing chamber allowing the coffee and water to mix in the chamber for a predetermined time to produce a coffee mixture while continuing the flow of each, discontinuing the flow of water and ground coffee into the chamber, beginning withdrawal of the coffee mixture from the chamber, reinitiating and continuing the flow of water in to the chamber for a predetermined amount of time while the mixture is being withdrawn from the chamber, discontinuing the flow of water into the chamber, withdrawing substantially all of the remaining mixture in the chamber, and removing the remaining ground coffee from the chamber. Preferably, the step of removing the mixture from the chamber includes removing it through the bottom of the chamber through use of a vacuum pump.

Other objects and features will be in part apparent and in part pointed out hereinafter.

BRIEF DESCRIPTION OF THE DRAWINGS

FIG. 12 is a cross-sectional view through the paper cutter mechanism at the same location as FIG. 11, but with the cutter mechanism moved to its forward most position;

FIGS. 13a and 13b are enlarged views of the saw-tooth blade of the cutter mechanism of the preferred embodiment of the present invention.

Corresponding reference characters indicate corresponding parts throughout the drawings.

DETAILED DESCRIPTION OF THE PREFERRED EMBODIMENT

Figure 1:
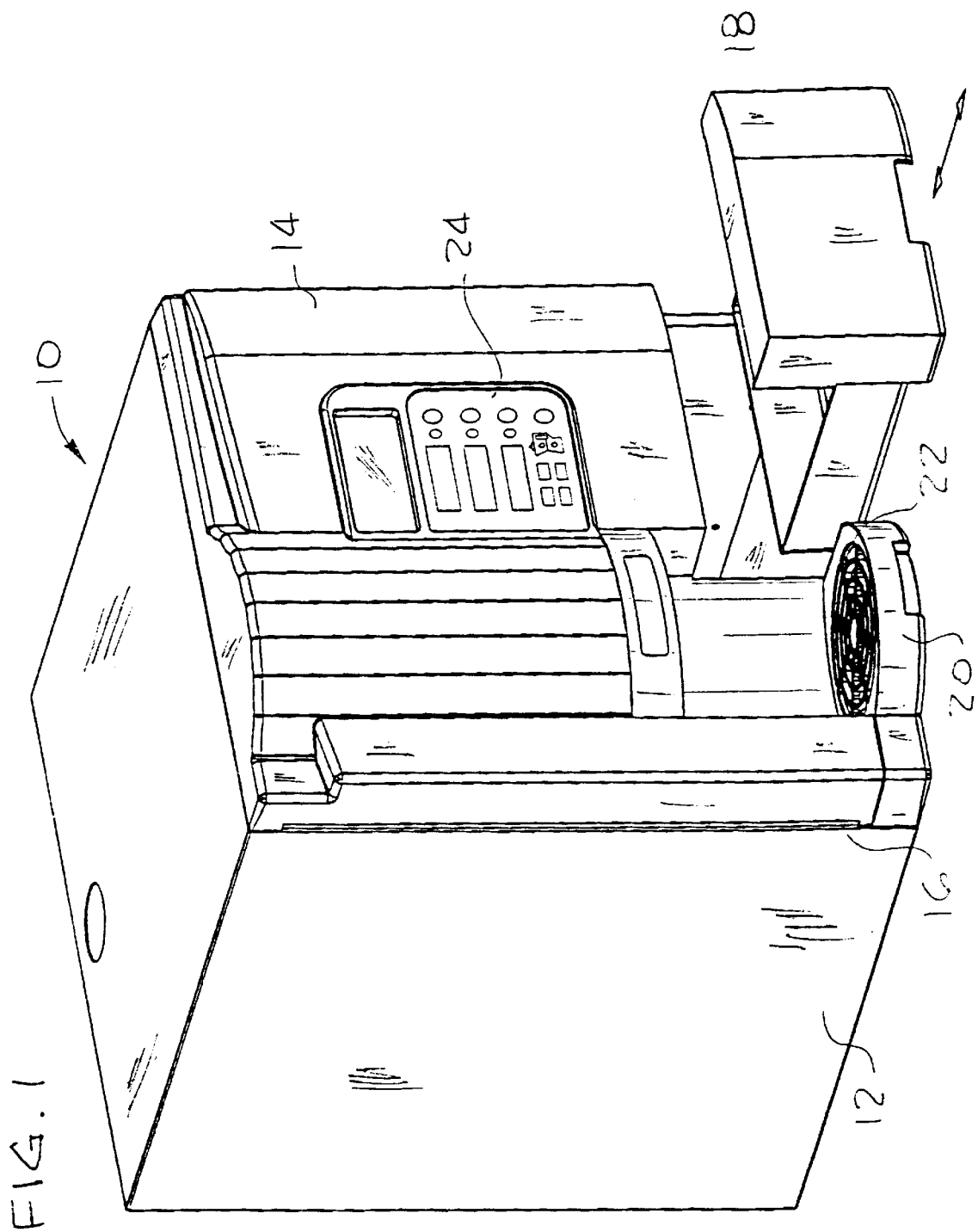
FIG. 1 is a pictorial view of the cabinet of the preferred embodiment of the present invention showing the removable tray partially removed from the cabinet.

The preferred embodiment of the table-top coffee vending machine of the present invention is illustrated generally by numeral 10 in FIG. 1. As shown in FIG. 1, the coffee machine 10 has a cabinet 12 with a front service door 14 which is hinged on the left at 16 to allow the door to be swung open. Shown in the lower right of the drawing is a removable cut paper collection tray 18 which can be slid in and out of the bottom cabinet 12 and is shown in FIG. 1 as being removed from the cabinet from its normal location. A cup station 20 with a spilled liquid collection drain 22 is positioned in the front door for receiving brewed coffee in a cup positioned thereon. A product selection key pad 24 is provided on the front door 14 which is used by a customer to make the selection of coffee, hot chocolate and any condiments such as sugar or creamer to be included so as to control the machine 10 in a well-known manner to provide the brewed coffee selection or hot chocolate as desired.

Figure 2:
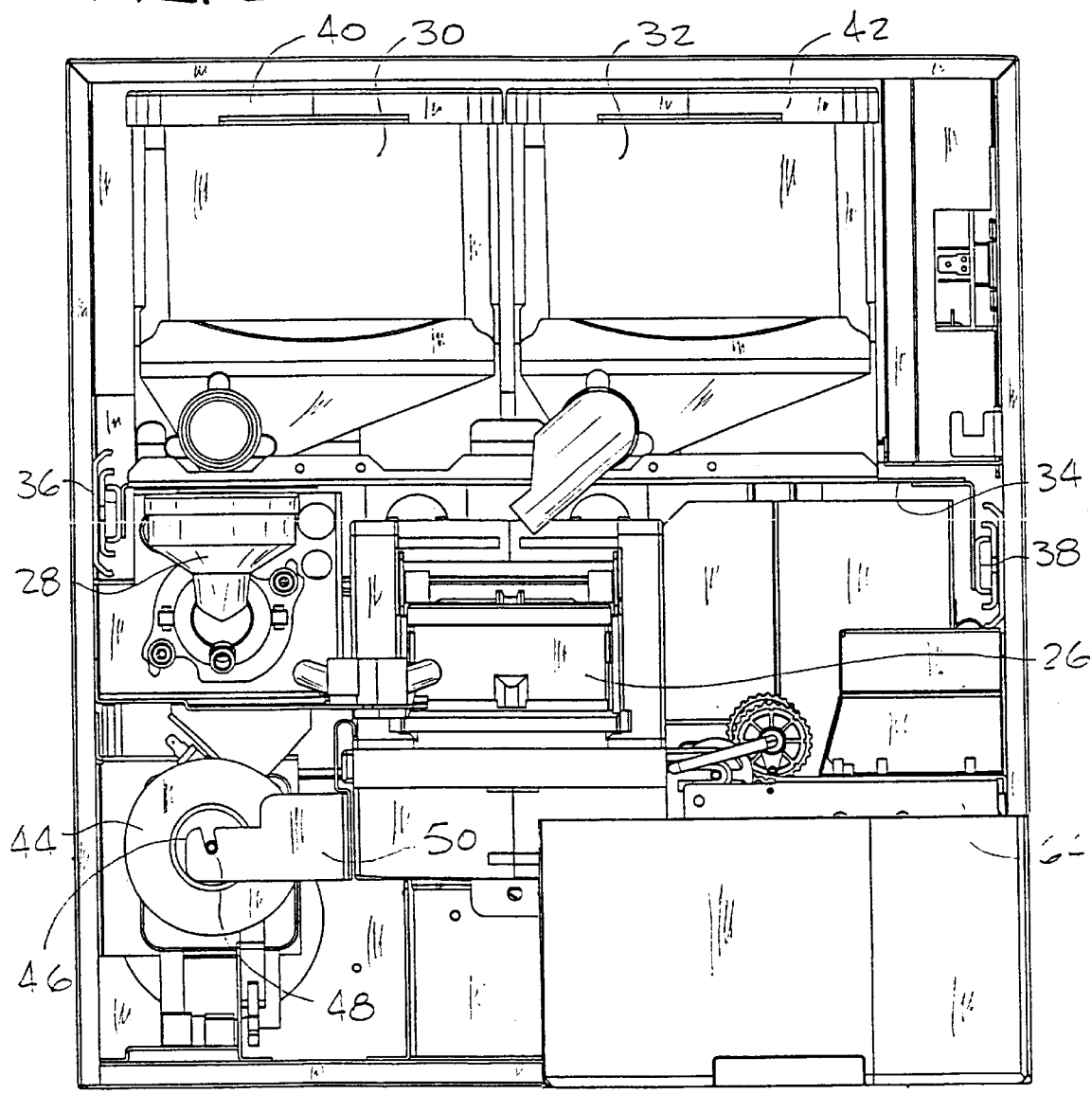
FIG. 2 is a front elevational view of the inside of the preferred embodiment of the present invention with the front cabinet door removed and the removable tray in position within the cabinet.
Figure 4:
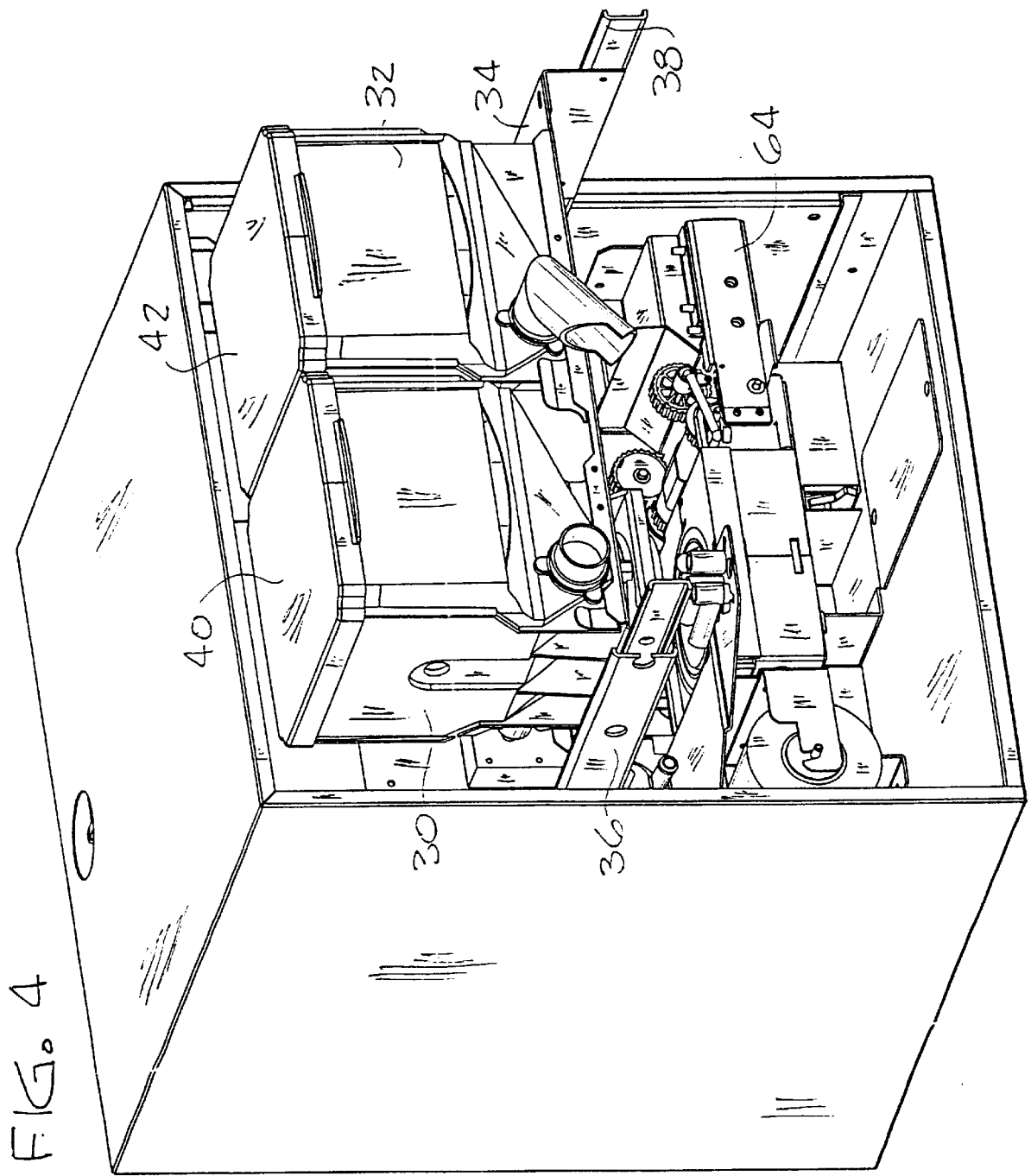
FIG. 4 is a pictorial view of the preferred embodiment with the storage canisters in their extended, filling position.
Figure 5:
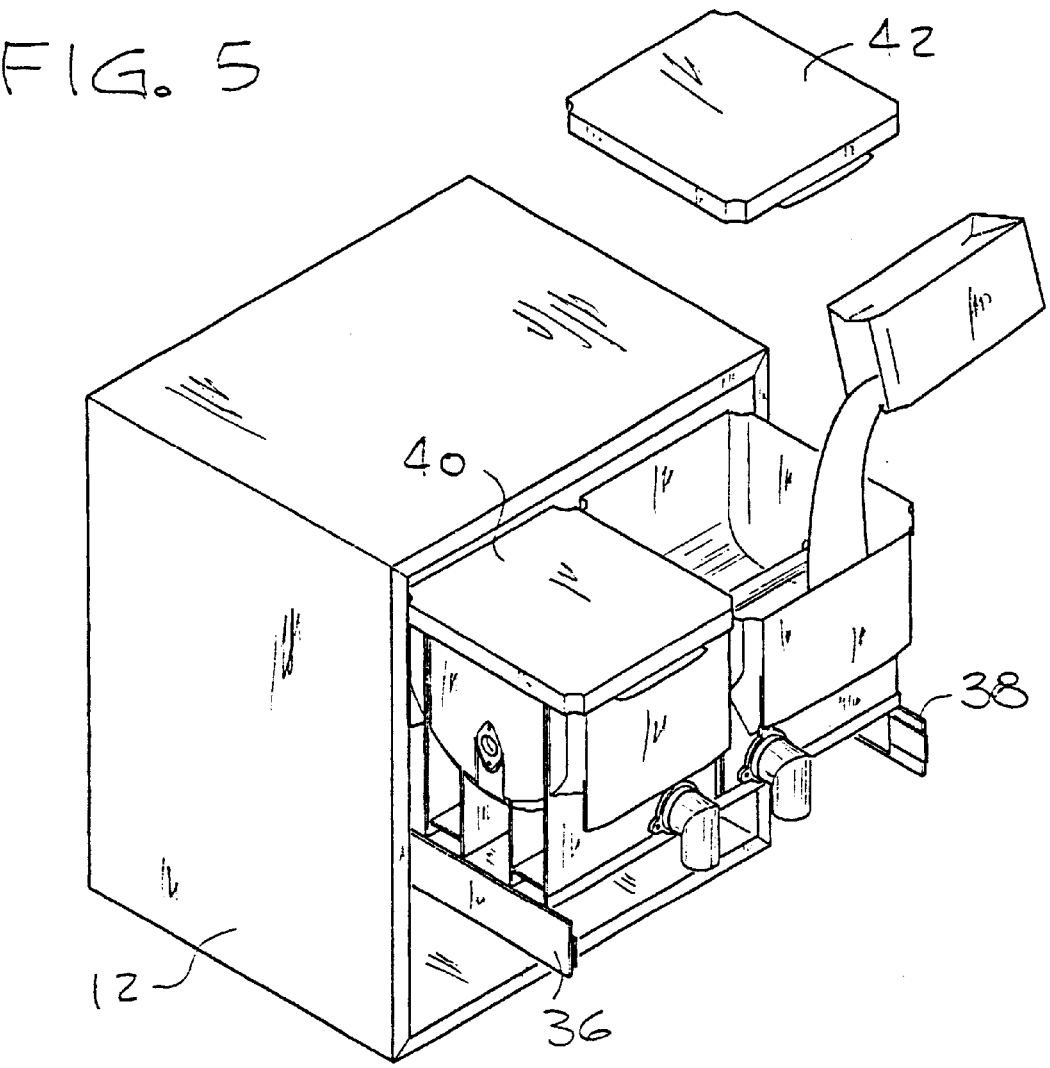
FIG. 5 is a schematic pictorial view of the preferred embodiment showing the filling of one of the storage containers.

The coffee machine 10 as illustrated in FIG. 2 with the service door 14 removed, generally includes a brewing chamber 26, a mixing bowl 28 with or without a whipper assembly for whipping the hot chocolate or coffee, a condiment or hot chocolate storage container 30 and a ground coffee storage container 32. Containers 30 and 32 are removably supported on a frame member 34 which in turn is secured at its sides to telescoping rails 36 and 38. Although only two such containers are shown, it is contemplated that any desired number of containers can be utilized to supply additional ingredients. As best seen in FIG. 4, containers 30 and 32 can be pulled out on the telescoping rails from the housing or cabinet 12 and after filling, returned to their position within the cabinet as seen in FIG. 2. With reference to FIG. 5, the lids 40 and 42 can be removed from containers 30 and 32 to add additional ground coffee or hot chocolate ingredients or condiments to the containers without actually removing them from the frame 34 and telescoping rails 36 and 38. However, if the need arises for example for cleaning, the containers 30 and 32 can be lifted off of the frame and removed entirely from the cabinet 12. Ingredients from either canister are dispensed through nozzles 33 and 35 into the mixing bowl 28 and brewer 26, respectively. The ingredient is supplied to the nozzles 33 and 35 by a motor driven auger (not shown) in a well known manner.

Figure 3:
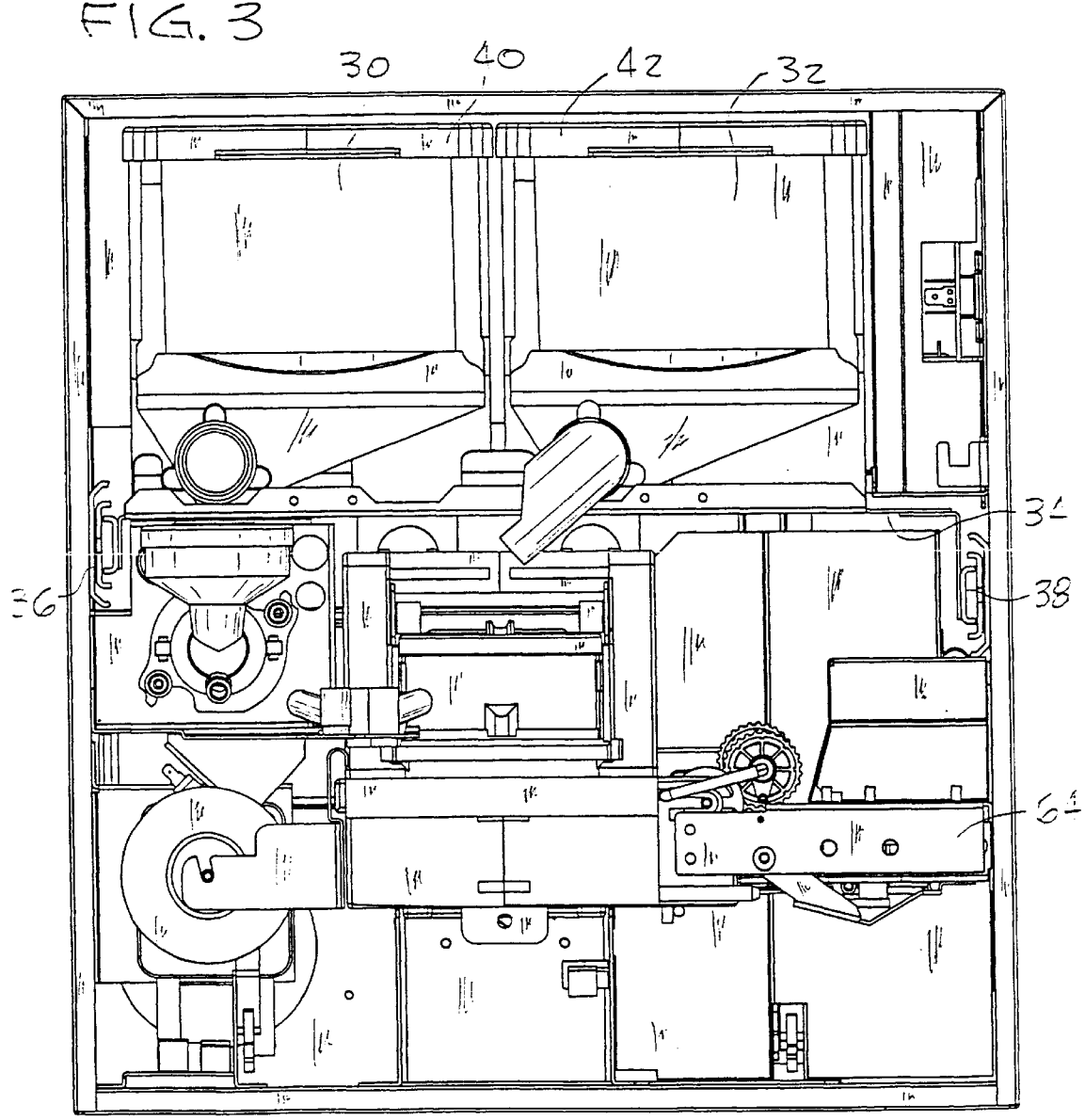
FIG. 3 is a view similar to FIG. 2 with the removable tray removed.
Figure 6:
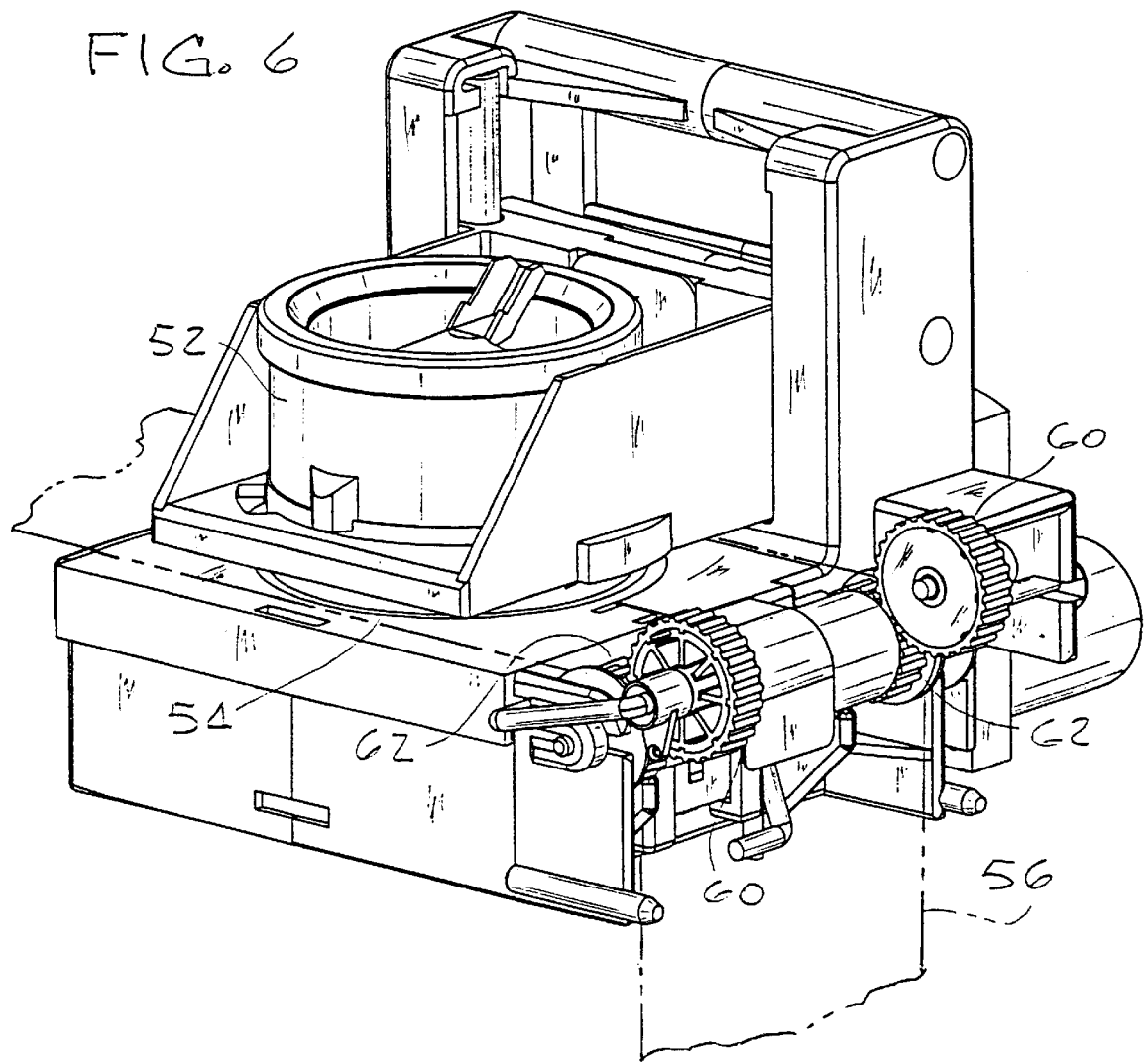
FIG. 6 is an enlarged pictorial view of the brewer and filter paper advancing mechanism of the preferred embodiment with the brewer in the closed position.
Figure 7:
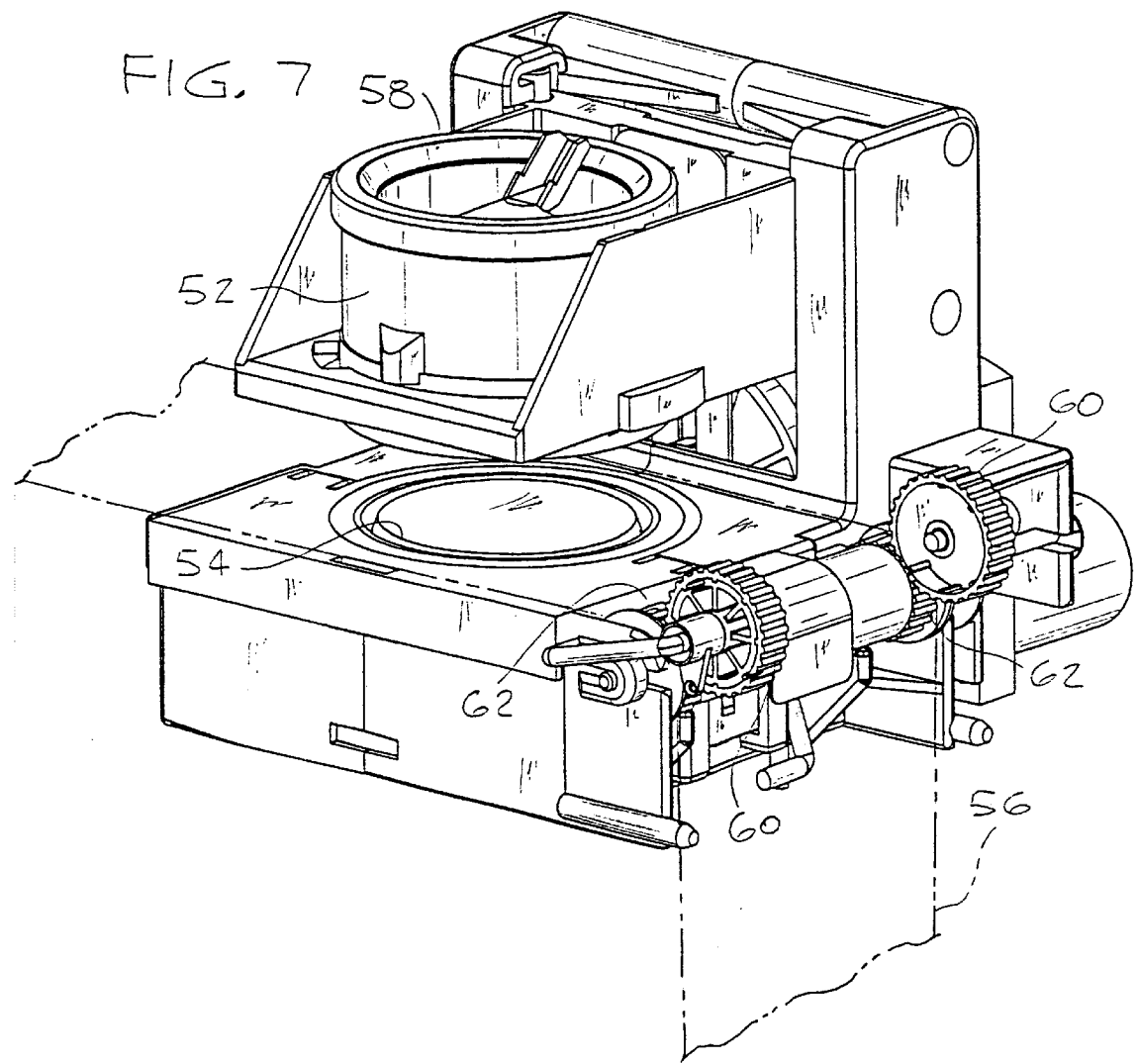
FIG. 7 is a view similar to FIG. 6 with the brewer in the open position.
Figure 8:
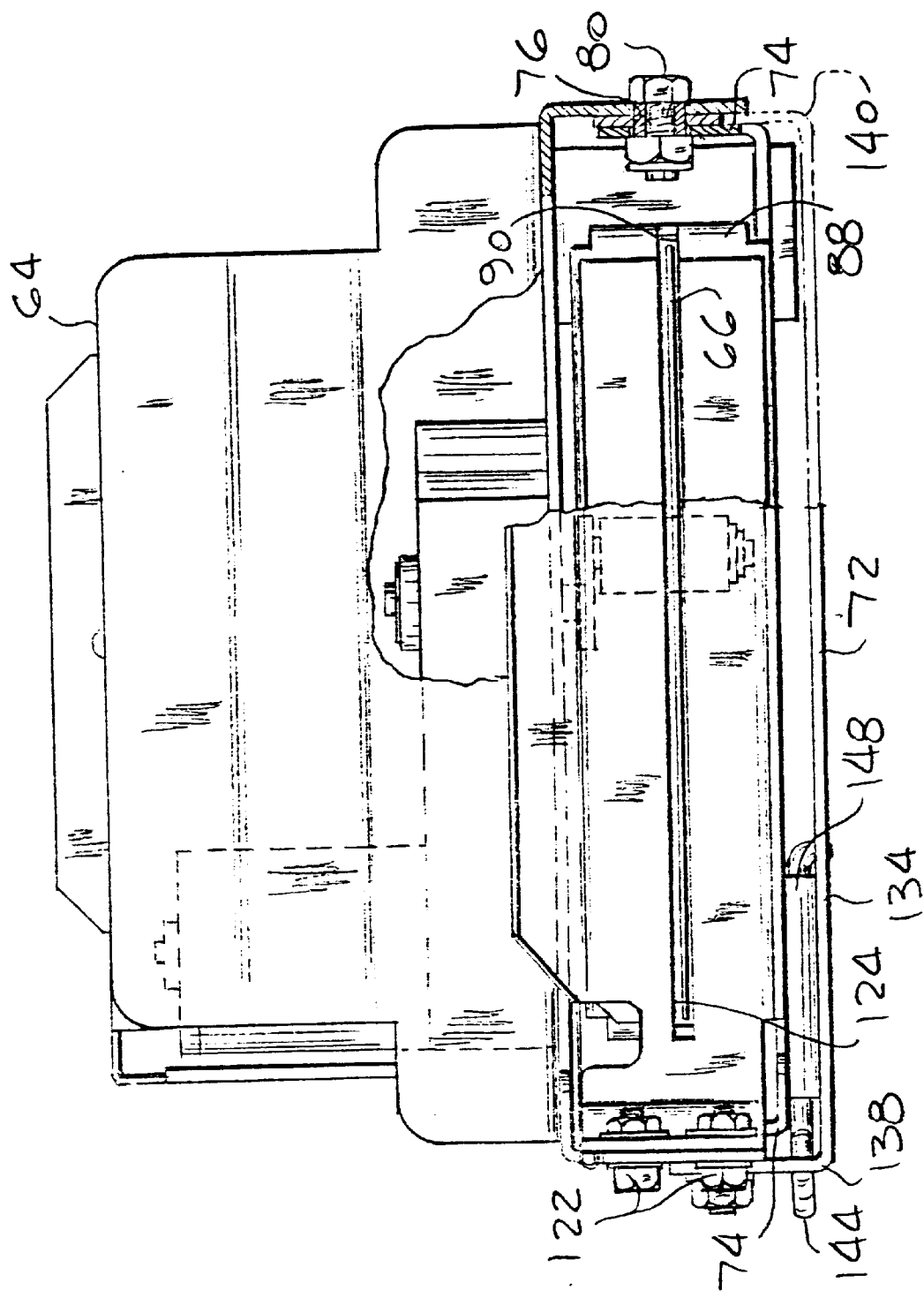
FIG. 8 is a front elevational view of the paper cutter mechanism of the preferred embodiment partially cut away and partially in cross-section.
Figure 9:
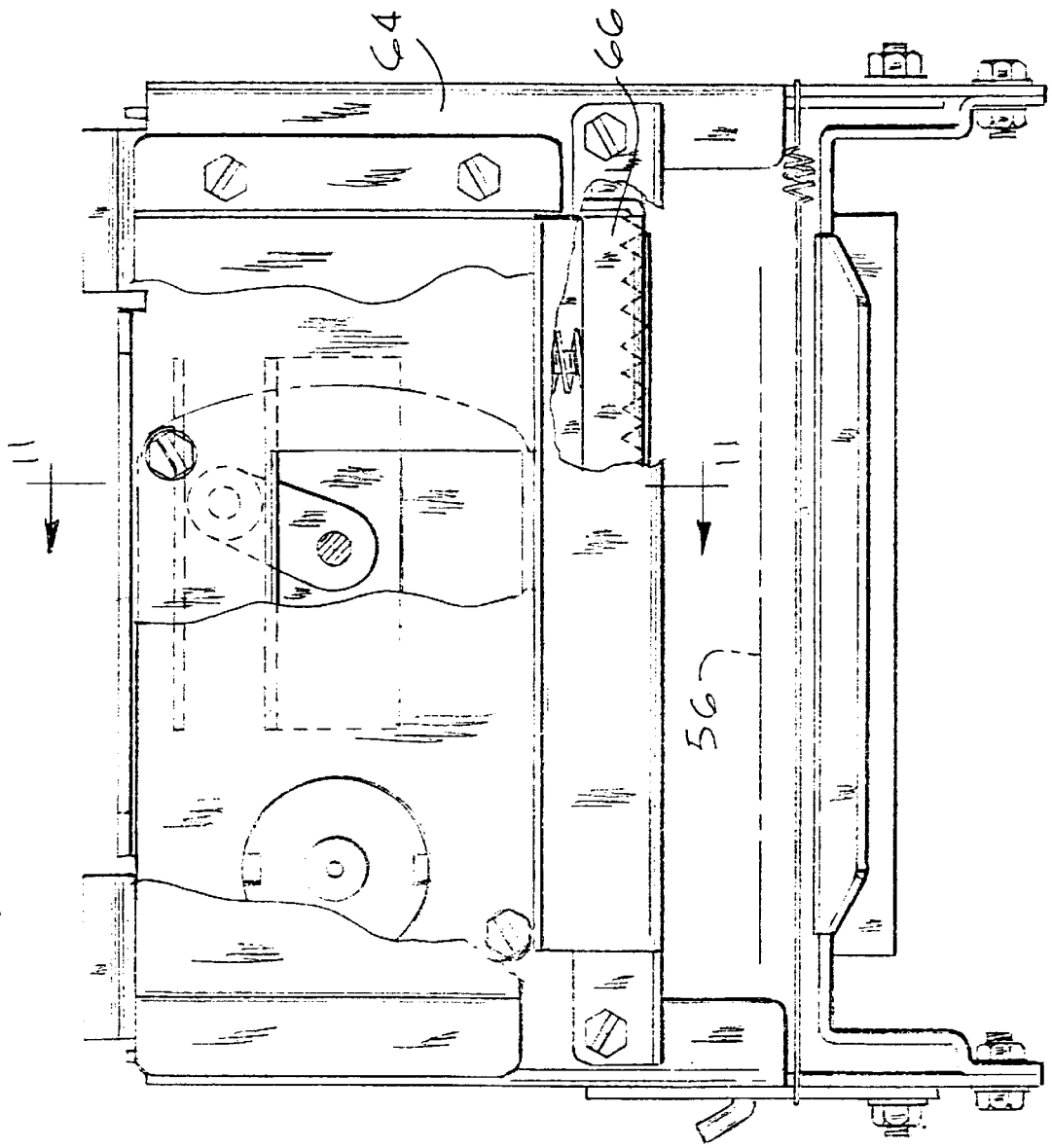
FIG. 9 is a top plan view of the paper cutter mechanism of the preferred embodiment partially cut away and partially in cross-section.

Referring again to FIG. 2, there is provided a filter paper system associated with the brewer which allows a new piece of filter paper to be positioned within the chamber of the brewer so that the mixture of hot water and coffee grounds is supported within the chamber above the filter paper and the brewed coffee is then removed from the bottom of the chamber and directed to a cup positioned in the cup station 20. A roll of filter paper 44 is mounted to a removable spindle 46 which is supported at its ends in slots 48 formed in a U-shaped support member 50 on the left side of the brewer 26. Brewer 26 is a two piece brewer, as best seen in FIGS. 6 and 7, with an upper chamber 52 supported for vertical movement towards and away from the lower chamber 54. The strip of filter paper 56 from the unwinding roll 44 can thus be passed between the two halves of brewer 26 and the brewer then closed on the filter paper by downward movement of the upper chamber 52 so that the mixture of water and coffee introduced into the open top 58 of chamber 52 mixes and is then drawn through the filter paper to leave the residue of coffee on the filter paper while extracting the coffee mixture to a cup. If desired, the brewed coffee can be drawn from the first chamber through the filter paper into and out of the second chamber through an opening in the bottom thereof and then introduced into the cup merely by gravity, although because of time constraints it is preferable to use a vacuum pump to withdraw the coffee mixture from the bottom of the brewer. In the preferred embodiment, a peristaltic pump is used for sanitary reasons although other similar types of pumps could be utilized as well. Up and down movement of the upper chamber 52 of brewer 26 towards and way from the lower chamber 54 can be effected by any desired mechanical connection such as an electric motor driven cam and follower arrangement which will produce the desired movement. The movement of the brewing chamber is coordinated with movement of the filter paper strip 56 by either a mechanical or electrical connection and controlled by a microprocessor (not shown) contained within the coffee machine 10 so that after a brewing cycle the upper chamber 52 is raised and the strip of used filter paper 56 is advanced so that the used portion of the paper is directed towards the collection tray 18. Such a mechanical system is disclosed, for example in U.S. Pat. No. 5,353,692, incorporated herein by reference. As illustrated in the preferred embodiment and as best seen in FIGS. 6 and 7, the filter paper 56 is advanced through the use of inter-engaging rotating wheels 60 and 62 with ribbed inter-engaging surfaces and positioned at the outer edges of the filter paper 56. As the filter paper strip 56 is advanced towards the tray 18 it passes through a paper cutting mechanism as shown generally as 64 in FIGS. 2 through 4. With reference to FIGS. 8 through 12, where the paper cutting mechanism 64 is shown in more detail, it is provided with a blade 66 mounted for reciprocating movement towards and away from the paper strip 56 so that it passes through the strip to sever it. Blade 66 in the preferred embodiment is a sawtooth blade with beveled edges which has proven to be effective in severing the wet paper with abrasive coffee grounds attached to it, and to be able to do this repeatedly with relatively little wear thus prolonging the life of the blade 66. Blade 66 is preferably made of stainless steel, such as 26 gauge Type 301, and has a 60 degree angle for angle A as shown in FIG. 13a, with the shorter teeth being approximately three hundredths of an inch shorter in length than the longer teeth. The beveled edge angle B on blade 66, as seen in FIG. 13b, is preferably 37.5 degrees. However, it is contemplated that other shapes of blades could be utilized with the present invention to effectively sever the filter paper 56. Cutting blade 66 is mounted to a cutting blade support member 68 which in turn is mounted for reciprocating movement within the main support structure 70 of paper cutting mechanism 64 which is stationarily mounted within the cabinet 12.

The blade support member 68 is a sheet metal formation having a flat bottom 72 extending across the width of the support member and terminating at the sides with upstanding vertical end members 74 which provide elongated slots 76. The vertical end members 74 are adjacent similar vertical side members 78 in the support structure 70. A pair of bolts 80 and 82 are positioned in holes drilled in the side members 78 which are in alignment with the slots 76 on each side of the cutting blade support member 68 and nuts are attached to the bolts 80 and 82. The bolts support the cutting blade support member 68 for sliding movement towards and away from the paper strip 56.

The blade 66 is attached to the blade support member 68 by bolts 84 which secure the blade to tabs 86 formed in the support member 68. The blade 66 is thus fixed to the blade support member 68 for reciprocating movement therewith.

Figure 11:
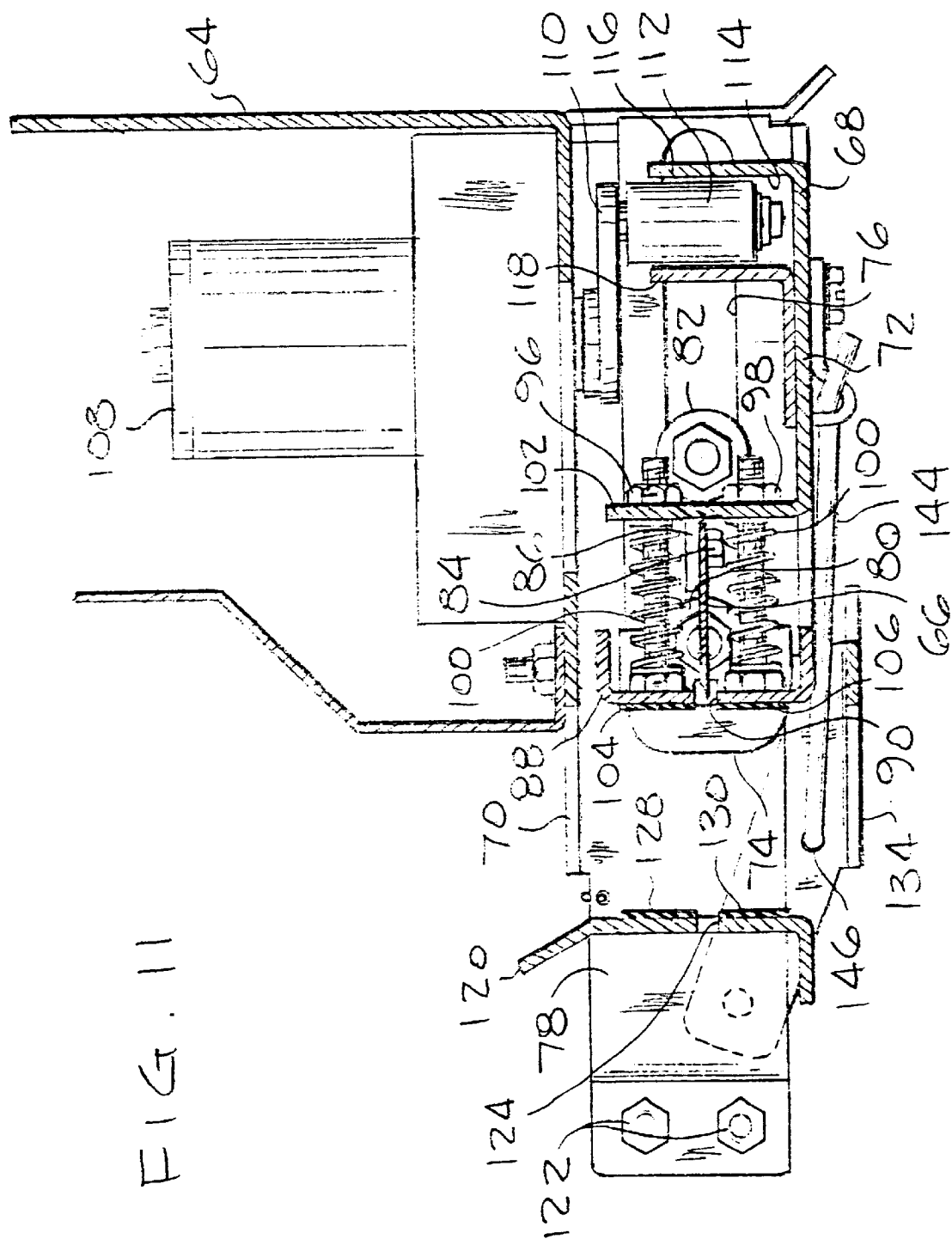
FIG. 11 is a side cross-sectional view of the paper cutter mechanism taken along line 11—11 of FIG. 9.

Also attached to the blade support member 68 is a paper strip clamping member 88, also formed of sheet metal. The paper clamping member has a vertical face with a blade receiving slot 90 formed across the width of the clamping member 88 with sufficient clearance to allow the blade 66 to pass through the slot 90 to penetrate the paper strip 56. Clamping member 88 is mounted to blade support member 68 with two pairs of bolts 92 and 94 near each end of the clamping member 88 and attached with nuts 96 and 98 through clearance holes in the clamping member. Springs 100 are placed on the bolts between the clamping member and the vertical face 102 of blade support member 68 and are maintained in a partially compressed state. Springs 100 normally bias the clamping member 88 towards its forward most position in front of blade 66, as best seen in FIG. 11. As the blade support member 68 is advanced as described below, and the springs 100 are compressed by the clamping member 68 the bolts 92 and 94 pass further through the corresponding holes in the front face 102 of the blade support member 68 which in turn allows the blade 66 to pass through slot 90 in the front face 102 of the clamping member 68. Preferably attached to the front face of clamping member 88 are compressible pads 104 and 106 which extend substantially across the face of clamping member 88 on each side of slot 90. These pads 104 and 106 will engage one side of the surface of paper strip 56 to clamp the strip 56 for cutting.

The reciprocating movement of the cutting blade support member 68 is achieved through the use of an electric motor 108 that drives a rotating arm 110 which in turn is provided at its outer end with a roller cam 112. Cam 112 is, in turn, received in a cam slot 114 formed on the blade support member 68 by a rear wall 116 formed by a vertical bend in the sheet metal support member 68, and a second vertical wall 118 formed by an L-shaped attachment welded to the bottom plate 72 of support member 68. As motor 108 is activated and rotates the arm 110 through one revolution, the cam roller 112 reciprocates within the cam slot 114 to first cause the forward movement of the cutting blade support member 68 and then the rearward movement thereof as the motor continues to rotate in the same direction so that for one revolution of motor 108 the cutting blade 66 is advanced towards and through the paper strip 56, as shown in FIG. 12, and then returned to its rest position, as shown in FIG. 11.

Attached to stationary support structure 70 is a stationary paper clamping member 120 secured to the structure by bolts 122. Stationary clamping member 120 is provided with a blade receiving slot 124 extending across the vertical face 126 of clamping member 120 and which is aligned for receiving blade 66 therethrough. A pair of compressible pads 128 and 130 are adhesively secured to the front vertical face 126 of stationary clamping member 120 in alignment with those similar pads 104 and 106 secured to the reciprocating clamping member 88.

Figure 10:
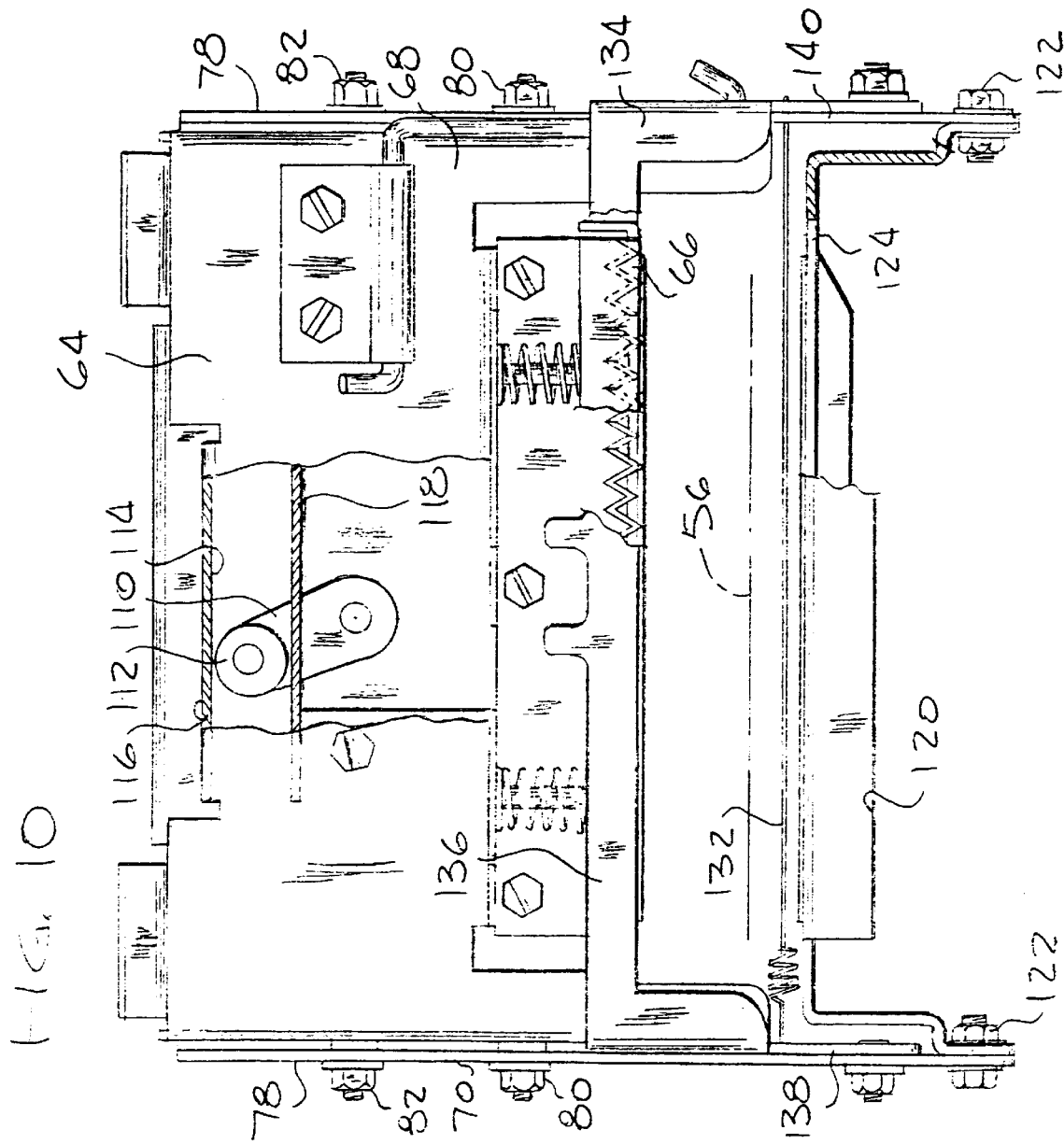
FIG. 10 is a bottom plan view of the paper cutter mechanism of the preferred embodiment partially cut away and partially in cross-section.

As best seen in FIG. 10, a spring wire 132 is attached to the sides of support structure 70 and extends across the path of the paper strip 56 as it passes through the paper cutting mechanism 64. The wire 132 permits some give in the path of movement of the paper strip 56 when the paper is being cut and it is basically intended to cause the remaining paper strip that has not been cut to be forced away from the front face of stationary clamping member 120 when the paper is not held against it by clamping member 88 since the wet filter paper might otherwise have a tendency to stick to that face and interfere with the future movement of the strip through the cutting mechanism 64.

Also mounted to the support structure 70 for pivotal movement is a sweeper bar 134. The sweeper bar 134 is also preferably formed of sheet metal and has a cross piece 136 extending between two pivotally mounted arms 138 and 140 mounted by bolts 142 to the side members of support structure 70. A sweeper drive link 144 in the form of a bent steel rod has one end engaged in a receiving hole 146 in arm 138 and an opposite end secured for pivotal movement to the bottom of cutting blade support member 68 by a clamping member 148. Thus, as the cutting blade support member is reciprocated the sweeper bar 134 is pivoted between an inoperative or retracted position as shown in FIG. 11 where the cross member 136 is folded up against the bottom of the support structure 70 and an operative or extended position as shown in FIG. 12 where it engages pieces of paper cut from the paper strip 56 by the cutting mechanism 64 and pushes them into a compressed pile as schematically illustrated in FIG. 12.

Figure 14:
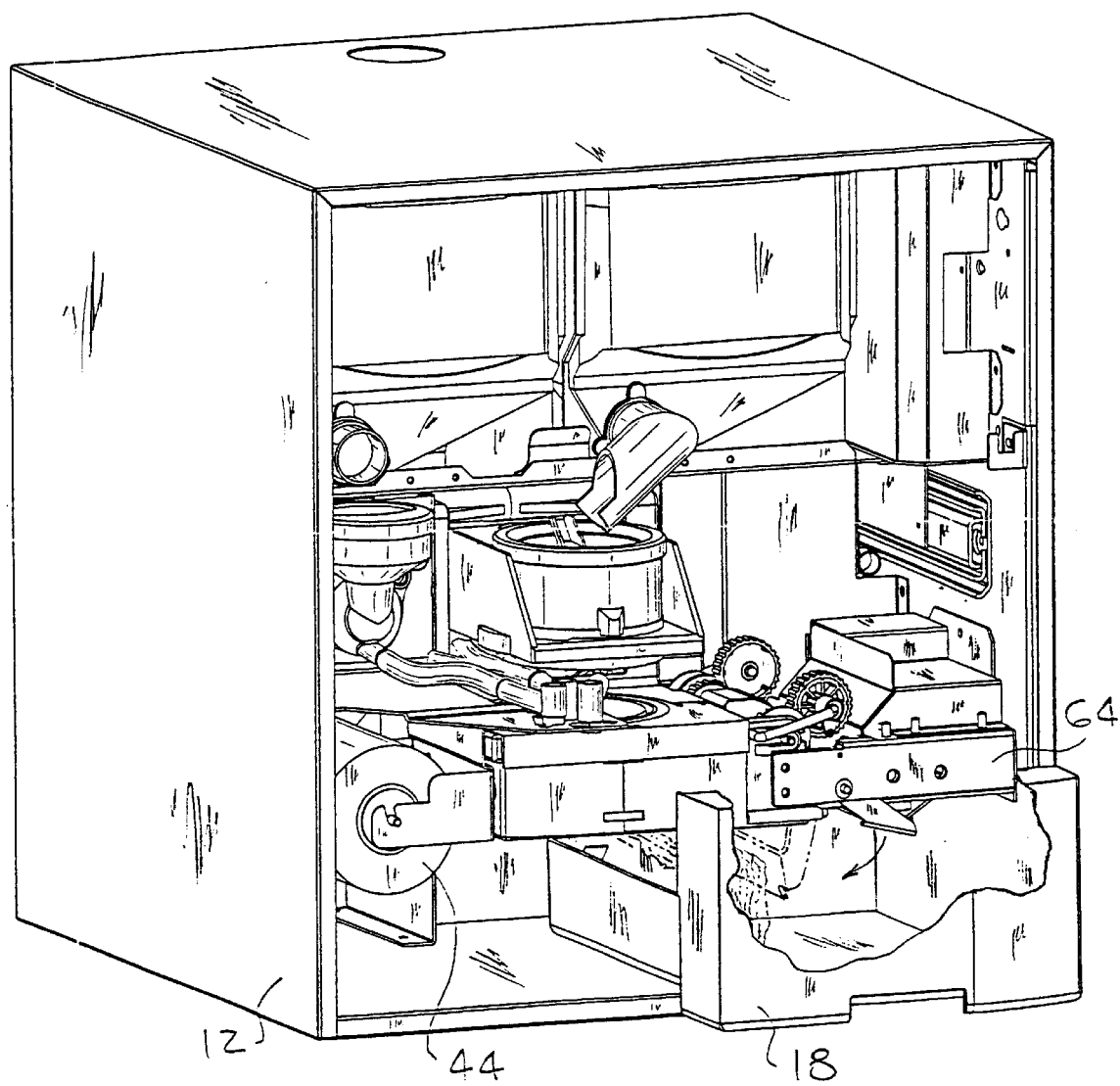
FIG. 14 is a pictorial view showing the paper collection tray inserted below the paper cutting mechanism of the preferred embodiment.

The cut pieces of paper from the paper strip 56 are accumulated in the cut paper collection tray 18 as illustrated in FIGS. 12 and 14. By using the sweeper bar 134 to continually compress the collected pieces of paper cut from strip 56 the collection tray can hold a much greater number of cut pieces than would be the case if they were merely allowed to accumulate in the bottom of the tray. When it comes time for servicing the machine, the service person need merely withdraw the tray 18 from the front of the machine without opening the front service door 14 and thus easily dispose of the cut pieces of paper and coffee grounds without the need to access the rest of the machine. In the normal rest position, the sweeper bar is in its retracted position folded up against the support structure 70, and thus does not interfere with removal of tray 18.

Because the coffee machine 10 is designed to fit on a standard height counter with storage cabinets above at a standard spacing above the counter, the machine is shorter than prior art machines and is therefore designed more compactly than those machines. To achieve this compact design a conventional brewing chamber was modified and shortened. However, this resulted in a brewing chamber that was too small to fill with sufficient coffee grounds and water to provide a full cup of coffee. In order to achieve a complete cup of coffee being supplied to a customer a unique method of brewing coffee was devised which in essences is a brewing "on-the-fly" method. In this method, coffee and water are substantially simultaneously introduced into the brewing chamber. The coffee grounds are introduced from the storage container 32 and the water is supplied from a source of hot water (not shown) in the back of the machine 10. At a predetermined time the flow of coffee grounds and water is interrupted and the mixture is allowed to steep in the brewing chamber, but it is insufficient to supply a complete cup of coffee to the cup station 20. After a predetermined time the coffee mixture is withdrawn from the brewing chamber through the filter paper 56 by a vacuum pump, such as peristaltic pump 150 which is connected by fluid lines from the brewer and to the cup station 20. As the mixture is withdrawn from the bottom of the brewer it causes the coffee grounds to be compressed on the top of filter paper 56 thus forming a bed of coffee through which the remaining mixture in the upper part of the brewer must pass. At about the same time the pump is activated the hot water supply is again activated and continues to flow for a predetermined amount of time such that a sufficient volume of water will ultimately be supplied to provide a complete cup of coffee to the cup station. Since the bed of coffee grounds has formed on the filter the reactivation of the water supply causes this water to pass through this bed and quickly achieve a coffee mixture as it continues to flow through and out of the brewer to the cup station. Thus, a greater volume of coffee can be supplied with a smaller brewing chamber than would otherwise be possible with conventional equipment.

In view of the above, it will be seen that the several objects of the invention are achieved and other advantageous results attained.

As various changes could be made in the above constructions and methods, without departing from the scope of the invention, it is intended that all matter contained in the above description and shown in the accompanying drawings shall be interpreted as illustrative and not in a limiting sense.

What is claimed is:

1. In a table-top coffee vending machine having a housing, a brewing system with a brewer and an ingredient mixing bowl, an ingredient and coffee storage system comprising:

at least one storage container having a removable top cap and a dispensing mechanism for dispensing an ingredient therefrom;

at least one telescoping rail supporting the at least one storage container for sliding movement between an operating position wherein the rail is in a retracted position and the container is disposed within the housing and the dispensing mechanism can be operated to supply said ingredient, and a filling position wherein the rail is in an extended position with the container disposed at least partially outside the housing such that the cap can be removed from the container for filling.

2. In a table-top coffee vending machine having a housing, a brewing system with a brewer and an ingredient mixing bowl, an ingredient and coffee storage system comprising:

a pair of storage containers having an opening in the top and a dispensing mechanism associated therewith for dispensing ingredients from the containers;

a pair of members mounted to the housing and supporting the pair of containers for movement between an operating position wherein the container is disposed within the housing and the dispensing mechanism can be operated to supply said ingredients, and a filling position wherein the container is disposed at least partially outside the housing such that the container can be filled.

\* \* \* \* \*